Dec. 11, 1962  R. G. OLANDER  3,067,773
FLUID FLOW CONTROLLER
Filed May 29, 1959
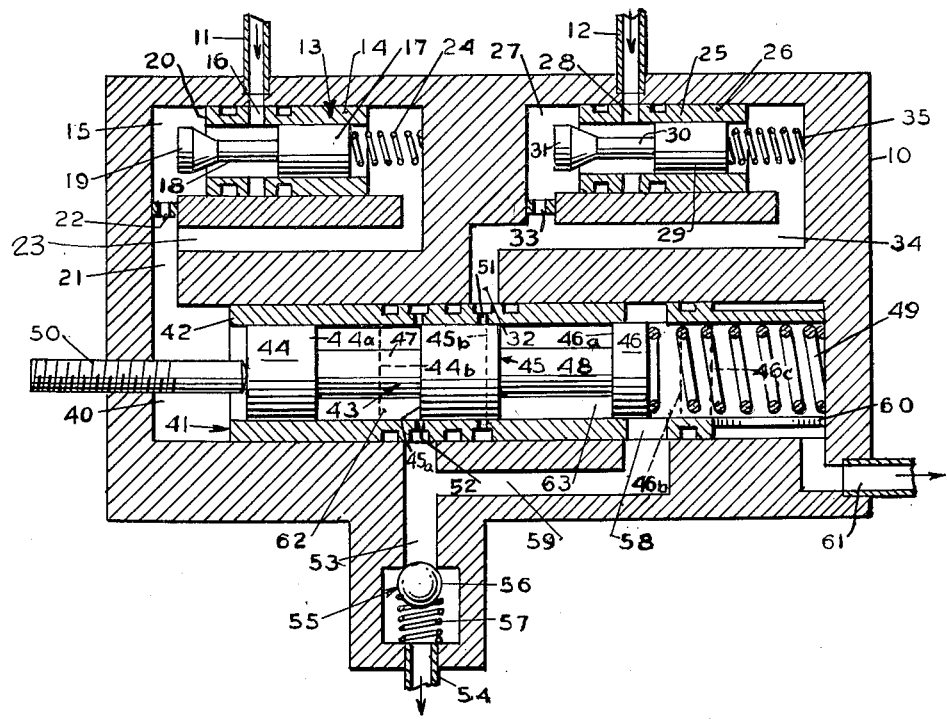
INVENTOR.
Robert G. Olander
BY
R. E. Geauque
ATTORNEY.

United States Patent Office 3,067,773
Patented Dec. 11, 1962

3,067,773
FLUID FLOW CONTROLLER
Robert G. Olander, Los Angeles, Calif., assignor to The Marquardt Corporation, Van Nuys, Calif., a corporation of California
Filed May 29, 1959, Ser. No. 816,738
1 Claim. (Cl. 137—613)

This invention relates to a fluid flow control and more particularly to a controller for metering a fixed quantity of fluid at a controlled flow rate.

In "hot streaks" afterburner ignition systems for jet engines, present control devices consist of one or more selector valves and an injection piston which discharges a measure quantity of fuel. The quantity of fuel that is injected is measured or controlled by the diameter and length of stroke of the injection piston. In operation, the injection piston cylinder is filled with fluid and thereafter, the other end of the piston is supplied with high pressure fluid which drives the piston the full length of its stroke and discharges the displaced fluid through the discharge port. In such control systems, the sequence of operations which port and direct the flow of fluid is controlled by appropriate selector valves or check valves.

The present invention has several distinct advantages over previous hydro-mechanical systems since it controls the discharge flow rate and accurately times the duration of the fluid discharge. The accuracy of both the duration of fluid discharge and the flow rate are independent of stickiness in the control or of the variations in supply and discharge pressures. The only limitation on insensitivity to pressure levels is that the supply pressure must be greater than the discharge pressure by an amount that is equal to the differential required to do the controlling. An additional advantage of this invention is the accurate time delay feature that allows any given increment of time to go by before starting to discharge the measured slug of fluid after initiation of the cycle.

The fluid flow controller utilizes two flow regulating valves, a shuttle valve and a check valve. The constant flow from one regulator valve is directed against one end of a movable valve member of the shuttle valve and drives the valve member against a spring to open up various ports in the shuttle valve in their irrespective sequence as the valve member travels the length of the shuttle valve. The other flow regulator valve supplies the fluid to the shuttle valve for delivery to the ignition system, and ports in the shuttle valve determine the increment of time in which the second regulator valve is connected with the discharge passage. The initial movement of the valve member of the shuttle valve provides for a set delay time prior to the discharge of fluid and additional movement of the valve member provides for discharge of the fluid at a given flow rate for a fixed increment of time.

It is therefore an object of the present invention to provide a fluid flow controller which meters a fixed quantity of fluid at a controlled flow rate.

Another object of the present invention is to provide a fluid flow controller which delays a set increment of time before discharging the fluid flow at a given flow rate for a fixed increment of time.

A further object of the invention is to provide a fluid flow controller having two constant fluid flow regulator valves, the fluid flow from one driving the valve member of a shuttle valve and the fluid flow from the other being controlled by the shuttle valve.

These and other objects of the invention, not specifically set forth above, will become readily apparent from the accompanying description and drawings in which the two regulator valves and the shuttle valves are illustrated.

The embodiment of the invention chosen for illustration comprises a casing 10 connected with passages 11 and 12 leading from a source of fluid supply pressure, such as a fuel pump. The passage 11 connects with a first regulator valve 13 having a sleeve 14 located within a compartment 15 in the casing 10. The sleeve 14 contains a port 16 and also slidably supports one end 17 of a slidable valve member 18. The other end of the valve member comprises a valve head 19 which cooperates with end 20 of the sleeve to port fluid into compartment 15 from the interior of the sleeve 14. A conduit 21 connects with compartment 15 and contains an orifice 22 to produce a pressure drop. The pressure downstream of the orifice 22 is applied through passage 23 to the end 17 of the valve member 18 and a spring 24 also acts in the same direction against end 17. The supply pressure from port 16 acting on end 17 is continually balanced by spring 24 and the presure in passage 23 to position the valve head 19 to provide a constant pressure drop across the orifice 22 and thus, a constant flow rate in the passage 21.

A second regulator valve 25 is also contained in casing 10 and is identical in construction to regulator valve 13. The regulator valve 25 has a sleeve 26 located within a compartment 27 and the sleeve contains a port 28 connected with supply passage 12. End 29 of valve member 30 is slidable within the sleeve 26 and the opposite end forms a valve head 31 which ports fluid from the sleeve into compartment 27. The fluid is discharged from compartment 27 to passage 32 through an orifice 33 and a passage 34 applies the pressure downstream of the orifice to the end 29 of the valve member 30. Also, a spring 35 acts against end 29 so that the spring force and the pressure in passage 34 continually balance the supply pressure from port 28 acting on end 29 in order to produce a constant pressure drop through orifice 33 and a constant flow rate in passage 32.

The passage 21 connects with a space 40 in casing 10 which contains a shuttle valve 41. The shuttle valve comprises a sleeve 42 which contains the movable valve member 43 having three enlarged land sections 44, 45 and 46 connected by shafts 47 and 48. The sleeve 42 also contains a spring 49 which bears against end section 46 to force the opposite end section 44 against an adjustable limit stop 50 threaded to the casing 10. The sleeve 42 contains ports 51 in direct communication with passage 32 and ports 52 in direct connection with a passage 53. The passage 53 communicates with discharge passage 54 through a check valve 55 comprising a ball 56 biased by a spring 57 against the end of passage 53. The sleeve 42 also contains a port 58 connected by a passage 59 to passage 53 and the end of the sleeve contains a discharge slot 60 connected with a return pressure passage 61.

In operation, the supply pressure passages 11 and 12 receive the fluid at a pressure which is greater than the discharge pressure at passage 54 by an amount corresponding to the minimum differential required to control the shuttle valve. The constant flow introduced to compartment 40 and against the end section 44 of the valve member 43 drives the valve member 43 away from the stop 50 and against the spring 49 to open up the ports 51, 52 and 58 of the shuttle valve in the desired sequence as the valve member travels the length of the sleeve. Thus, initiation of the operation of the device is controlled by the presence of the supply pressure in passages 11 and 12. Upon receipt of the supply pressure, regulator valve 13 produces a constant rate of fluid flow to the shuttle valve and this fluid moves the shuttle valve member 43 at a constant rate until it completes a stroke. In the initial position of the shuttle valve, the valve member 45 has a fixed amount of overlap over the port 51 and therefore, flow from regulator valve 25 through ports 51 and 52 and check valve 55 cannot take place until the side 45a of the valve section 45 has moved to position 45b to open port 51. Thus, the initial movement of the valve member 43 after pressure is introduced to compartment 40 results in a delay of fixed increment of time required to move the valve section 45 past the port 51. Thereafter, the port 51 is in communication with the port 52 through the space 62 located between valve sections 44 and 45 to produce a valve passage. While this communication exists, the regulated constant flow from regulator valve 25 and passage 32 is discharged past the check valve 55 to the desired source connected with discharge passage 54.

At the time the ports 51 and 52 become connected, the side 44a of section 44 has moved to position 44b and the side 46a of section 46 has moved to positions 46b so that port 58 communicates with space 63 between valve sections 45 and 46 and is blocked from the return port 61. The continued movement of the valve member 43 will cause valve section 44 to cover port 52 and at the time this occurs, the side 46a of section 46 will arrive at position 46c to commence the opening of slot 60. Thereafter, during further movement of the valve member 43, the port 58 will be in continuous communication with the return pressure in passage 61 to vent the pressure in the discharge passage 53 and allow the check valve 55 to seat in order to sharply cut off the discharge to the source through passage 54.

It is therefore apparent that the length of the flow period through passages 51 and 52 is controlled by the space between the valve sections 44 and 45 and the rate of movement of valve member 43. The time delay interval, the flow rate and the duration of the stroke can be independently adjusted by setting the two flow rates of the regulator valves 13 and 25 and the delay adjustment stop 50 to give the desired values of these quantities. Also, variations in the supply pressure in passages 11 and 12 or in the discharge pressure in passage 54 cause only a small percentage of change in the above mentioned quantities due to the droop action caused by the use of the springs in the flow regulator valves. Once the discharge passage 53 is connected to the return pressure in passage 61, recycling of the controller occurs only upon decrease of the supply pressure to the value of the return pressure in passage 61 in order to allow the spring 49 to return the shuttle valve to its initial position. Thereafter, increased supply pressure can be applied to passages 11 and 12 to again move the shuttle valve through its complete stroke to cause the desired sequence of operation.

It is therefore apparent that the present invention provides a fuel flow controller which meters a specific quantity of fluid and discharges it into the required location. In metering the specific quantity of fluid, the controller delays a set increment of time and discharges the flow at a given flow rate for a fixed increment of time. The return port 61 permits the return of excess fluid and quick relief of the pressure in the discharge line 53 at the completion of the metering stroke. It is apparent that the controller can be utilized to meter various fluids in a variety of systems which require the injection of a fixed quantity of fluid at a controlled flow rate. The delay prior to fluid flow can be varied or eliminated if so desired and the controller can be used without provision for quick relief of the discharge pressure. Various modifications are contemplated by those skilled in the art without departing from the spirit and scope of the invention as hereinafter described by the appended claims.

What is claimed is:

A fluid flow controller comprising a supply of fluid at a source pressure, first and second regulator valves connected with said supply pressure and each discharging a constant rate of fluid flow, a shuttle valve comprising a sleeve and a valve member movable within said sleeve, spring means for biasing said valve member towards one end of said sleeve and against a stop member, four spaced ports located in said sleeve along the length thereof, the first port located nearest said stop member being connected with a discharge passage from said selector valve and the second port being connected with the output of said second regulator valve, the third port being connected with said discharge passage and the fourth port being a slot in said sleeve connected with a return pressure passage, said valve member comprising three spaced valve sections with the second center section normally covering said second port, the end face of the first valve section closest said stop member being connected with the fluid discharge from said first regulator valve for moving said valve member against said spring means at a constant rate to uncover said second port by movement of said second section and thereafter cover said first port with said first valve section, the third valve section uncovering said third port for connecting the third port with the space intermediate the first and third valve sections while said first and second ports are uncovered and until movement of said first valve section over said first port, said third valve section thereafter uncovering said fourth slot port for connecting said third port with the fourth port through said intermediate space to quickly relieve the pressure in said discharge passage.

References Cited in the file of this patent
UNITED STATES PATENTS

| | | |
|---|---|---|
| 987,080 | Rankin | Mar. 14, 1911 |
| 1,820,653 | Ernst | Aug. 25, 1931 |
| 2,045,823 | Barrow | June 30, 1956 |
| 2,741,262 | Crookston | Apr. 10, 1956 |
| 2,902,155 | Lundeen | Sept. 1, 1959 |
| 2,964,104 | McAulay | Dec. 13, 1960 |